Patented June 3, 1941

2,244,339

UNITED STATES PATENT OFFICE 2,244,339

DISAZO DYES FOR CELLULOSE ESTERS AND ETHERS

Donovan E. Kvalnes, Penns Grove, N. J., assignor to E. I. du Pont de Nemours & Company, Wilmington, Del., a corporation of Delaware No Drawing. Application November 22, 1939, Serial No. 305,656

9 Claims. (Cl. 260—191)

This invention relates to disazo dyes which are especially useful for dyeing cellulose esters and ethers, such as cellulose acetate silk and to processes for manufacturing the same, and especially to dyes having a general formula

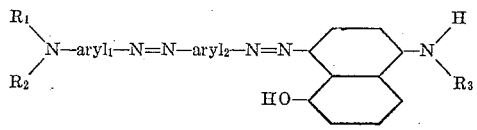

in which aryl₁ and aryl₂ are like or unlike benzene or naphthalene nuclei which may or may not be substituted by other groups, $R_3$ is a mono- or poly-hydroxyalkyl group containing two to six carbons, and $R_1$ and $R_2$ are from the group consisting of alkyl groups, said hydroxyalkyl groups and polyethenoxy groups.

It is among the objects of the invention to dye cellulose esters and ethers. Another object is to provide dyes which have good affinity for cellulose acetate and will yield deep shades of blue, bluish green and black. Another object is to provide processes for preparing such dyes. Still other objects of the invention will be apparent from the following description.

The objects of the invention are attained in general by providing compounds represented by the general formula and applying them to the fibers or materials to be dyed. The objects are attained in part by providing compounds which are obtainable by diazotizing a para nitro aniline or naphthylamine or a mono N-substituted para-arylene diamine of the benzene or naphthalene series, coupling with a suitable benzene or naphthalene tertiary amine, transforming the nitro or N-substituent of the arylene diamine nucleus to amino to give an arylazo compound represented by the formula

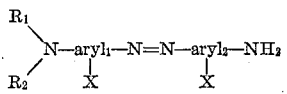

diazotizing this monazo compound, and then coupling with a mono N-substituted 1:5-amino naphthol.

The invention will be more fully set forth in the following more detailed description which includes examples that are given as illustrative embodiments of the invention and as limitations thereof.

Example 1

180 parts of oxalyl para-phenylene diamine were dissolved in 2500 parts of water and 110 parts of 28.5% ammonia solution. The solution was cooled to 0–5° C. by the addition of ice and 69 parts of sodium nitrite were added. This solution was slowly added to 1000 parts of water and 360 parts of a 31.5% hydrochloric acid solution whilst cooling with ice to 0–5° C. When diazotization was complete a solution of 195 parts of di(hydroxethyl) m-toluidine in 1000 parts of water and 1000 parts of 31.5% hydrochloric acid solution was added to the diazo. Dilute sodium hydroxide solution was then added slowly until the mixture was only slightly acid to litmus paper. After stirring for two to three hours at 10° C. coupling was complete. Enough solid sodium hydroxide was added to give a 5% solution and the temperature was slowly raised to 90° C. and held there two hours or until hydrolysis was complete. The reaction mixture was cooled to 20° C. and filtered and the residue was washed with sufficient cold water to free it from alkali and dried.

314 parts of the dry material were dissolved in 1000 parts of water containing 300 parts of 31.5% hydrochloric acid and cooled with ice to 0° C. The compound was diazotized by the addition of 69 parts of sodium nitrite dissolved in 200 parts of water. The diazo solution was then added to a solution of 203 parts of N(hydroxyethyl) 1,5-amino naphthol in 8000 parts of water and 100 parts of 31.5% hydrochloric acid. Coupling was completed by the slow addition of sodium acetate solution until the reaction mixture was neutral to Congo red paper. The dye was isolated from a neutral solution, washed with water and dried. The compound is represented by the formula

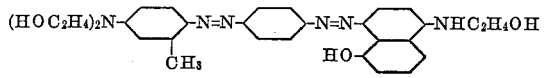

When dispersed in an aqueous medium with a suitable dispersing agent, such as soap the product dyed cellulose acetate in heavy blue shades of good fastness to light, which discharged to a white upon applying a suitable discharge agent.

Example 2

271 parts of methyl, sorbityl aniline, obtained by the treatment of sorbityl aniline with dimethyl sulfate, were substituted for the di(hydroxyethyl) m-toluidine used in Example 1. A dye was obtained which readily dispersed and which dyed cellulose acetate heavy navy blue shades. The dye is represented by the formula

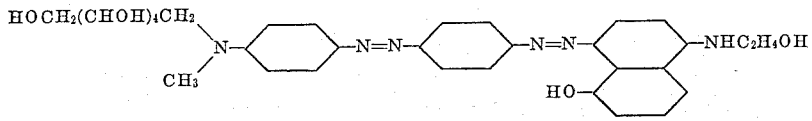

Example 3

An equivalent amount of sorbityl, hydroxy ethyl aniline, obtained by heating sorbityl aniline with an excess of 40% ethylene chlorhydrin in the presence of chalk, was used instead of the di(hydroxy ethyl) m-toluidine in Example 1. A dye which is represented by formula was obtained.

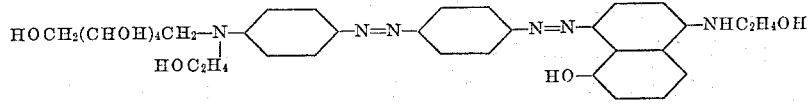

This product is readily dispersed and it dyed cellulose acetate a heavy reddish blue shade which discharged to a white.

Example 4

An equivalent amount of N-sorbityl, 1,5-amino naphthol, prepared by refluxing 1,5-amino naphthol and glucose in alcohol and reducing with a nickel catalyst, was substituted for the N-hydroxy ethyl 1,5-amino naphthol in Example 1. A dye was obtained which is represented by the following formula

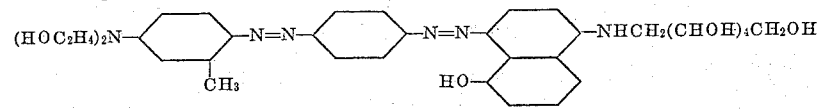

This product built up on the fiber to give very heavy blue to nearly black shades.

In the following examples the arrows point from the diazo component which is a mono N-substituted para-phenylene diamine, such as formyl-, acetyl-, oxalyl-, benzoyl-, arylsulfonylamino para-phenylene diamine or a para-nitro aniline. In making the compounds the diazo component was diazotized and coupled with the first component recited in the formula and then the terminal acylamino or nitro group of the monazo compound was hydrolized or reduced, as the case may be, to amino, thus giving a terminal diazotizable amino group. Terminal hydrolizable groups on the monazo compounds, such as acylamino were transformed to amino groups by a method similar to that described in Example 1. When the diazo component was a para-nitro aniline or naphthylamine, the terminal nitro group of the monazo compound was transformed to amino by reduction, such as by heating the monazo compound with one and one-half moles of sodium sulfide in alkaline medium until the nitro group was reduced. The arrows point toward the compounds which were used as the coupling components. The indicated colors are those obtained by dyeing acetate silk in aqueous dispersions or solutions of the compounds.

| Example | Compound | Color on cellulose acetate silk | Example | Compound | Color on cellulose acetate silk |
|---|---|---|---|---|---|
| 5 | Dimethyl aniline ← p-nitro aniline, reduced → N-(hydroxy ethyl)-1,5-amino naphthol. | Bluish grey. | 17 | Di(hydroxy ethyl) 2,5-dimethoxy aniline ← 5-nitro-2-amino anisol, reduced → N-(hydroxy ethyl)-1,5-amino naphthol. | Navy blue. |
| 6 | Di (hydroxy ethyl) aniline ← oxalyl p-phenylene diamine, hydrolyzed → N-(hydroxy ethyl)-1,5-amino naphthol. | Reddish blue. | 18 | Di(hydroxy ethyl) 2,5-dimethoxy aniline ← 2,5-di ethoxy para-phenylene diamine → N-(hydroxy ethyl)-1,5-amino naphthol. | Greenish blue. |
| 7 | Ethyl, hydroxy ethyl aniline ← formyl p-phenylene diamine, hydrolyzed → N-(hydroxy ethyl)-1,5-amino naphthol. | Navy blue. | 19 | Di(hydroxy ethyl) o-anisidine ← 5, nitro-2-amino anisol, reduced → N-hydroxy ethyl)-1,5-amino naphthol. | Reddish blue. |
| 8 | Di (hydroxy ethyl) aniline ← 5-nitro-2-amino anisol, reduced → N-(hydroxy ethyl)-1,5-amino naphthol. | Do. | 20 | Sorbityl, hydroxy ethyl m-toluidine ← benzoyl p-phenylene diamine, hydrolyzed → N-(hydroxy ethyl)-1,5-amino naphthol. | Navy blue. |
| 9 | Bis (dihydroxy propyl) aniline ← acetyl p-phenylene diamine, hydrolyzed → N-(hydroxy ethyl)-1,5-amino naphthol. | Reddish blue. | 21 | Di(hydroxy ethyl) aniline ← p-nitro aniline, reduced → N-sorbityl 1,5-amino naphthol. | Reddish blue. |
| 10 | Di (hydroxy ethyl) m-toluidine ← 5-nitro-2-amino anisol, reduced → N-(hydroxy ethyl)-1,5-amino naphthol. | Navy blue. | 22 | Di(hydroxy ethyl) m-toluidine ← 2-chlor-4-nitro aniline, reduced → N-sorbityl 1,5-amino naphthol. | Blue. |
| 11 | Di (hydroxy ethyl) m-toluidine ← 2,5-dimethoxy para-phenylene diamine → N-(hydroxy ethyl)-1,5-amino naphthol. | Greenish blue. | 23 | Di(hydroxy ethyl) o-anisidine ← 5-nitro-2-amino-anisol, reduced → N-sorbityl 1,5-amino naphthol. | Reddish blue. |
| 12 | Di (hydroxy ethyl) m-toluidine ← nitro cresidine, reduced → N-(hydroxy ethyl)-1,5-amino naphthol. | Do. | 24 | Sorbityl, hydroxy ethyl aniline ← oxalyl p-phenylene diamine, hydrolyzed → N-sorbityl 1,5-amino naphthol. | Do. |
| 13 | Di (hydroxy ethyl) m-toluidine ← 2-chlor-4-nitro aniline, reduced → N-(hydroxy ethyl)-1,5-amino naphthol. | Clear blue. | 25 | Sorbityl aniline condensed with 7 moles ethylene oxide ← p-nitro aniline, reduced → N-(hydroxy ethyl)-1,5-amino naphthol. | Do. |
| 14 | Di (hydroxy ethyl) m-toluidine ← 4-nitro-1-naphthylamine, reduced → N-(hydroxy ethyl)-1,5-amino naphthol. | Blue. | 26 | Tetrahydroxy ethyl m-phenylene diamine ← p-nitro aniline, reduced → N-(hydroxy ethyl)-1,5-amino naphthol. | Blue. |
| 15 | Di (hydroxy ethyl) 2,5-dimethoxy aniline ← benzene sulfonyl p-phenylene diamine, hydrolyzed → N-(hydroxy ethyl)-1,5-amino naphthol. | Clear blue. | 27 | Aniline condensed with 6 moles of ethylene oxide ← p-nitro aniline, reduced → N-(hydroxy ethyl)-1,5-amino naphthol. | Reddish blue. |
| 16 | Di (hydroxy ethyl) 2,5-dimethoxy aniline ← nitro cresidine, reduced → N-(hydroxy ethyl)-1,5-amino naphthol. | Greenish blue. | 28 | Ethyl, hydroxy ethyl-1-naphthylamine ← p-nitro aniline, reduced → N-(hydroxy ethyl)-1,5-amino naphthol. | Blue. |

The compounds of the invention are represented generally by the formula

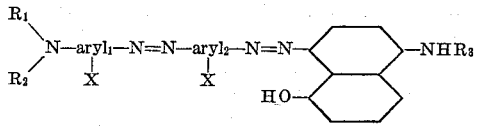

The tertiary aryl amines which may be used as the first component comprise benzene and naphthalene compounds of the type

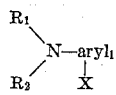

in which $R_1$ and $R_2$ are alike or unlike and may be lower alkyl, mono- and poly-hydroxyalkyl, or poly-ethenoxy. Examples of such groups are methyl, ethyl, propyl, butyl, hydroxyethyl, hydroxypropyl, dihydroxypropyl, mono- and dihydroxybutyl, sorbityl, pentaerythrityl and other hydroxyalkyls having four to six carbons and one less hydroxy than carbons which are either straight or branched chain aliphatics, and various polyethenoxy groups or mixtures thereof which can be made by reacting an aniline or naphthylamine with 3 to 6 moles of ethylene oxide and thereby producing compounds having two terminal hydroxyethyl groups and one to four ether linkages of the type $$Aryl-N\begin{matrix}(CH_2CH_2O)_{n-1}-CH_2CH_2OH \\ (CH_2CH_2O)_{n-1}-CH_2CH_2OH\end{matrix}$$

in which $n$ is an integer 1 to 5, such as $$C_6H_5N-[(CH_2CH_2O)_2-CH_2CH_2OH]_2$$

and $$C_6H_5-N\begin{matrix}CH_2CH_2O-CH_2CH_2OH \\ (CH_2CH_2O)_3-CH_2CH_2OH\end{matrix}$$

The substituents X in the general formula are one or more than one of the group consisting of hydrogen, alkyl, alkoxy, halogen, acylamino, dialkylamino, such as methyl, ethyl, propyl, butyl, the corresponding alkoxy groups, chloro, bromo, acetylamino, benzoylamino, dimethylamino and diethylamino. When $aryl_1$ contains more than one substituent the substituent groups may be alike or unlike.

$Aryl_2$ in the general formula is a benzene or naphthalene nucleus which may be substituted or not by the groups indicated as the substituents of $aryl_1$.

As illustrations of the group $R_3$ the following are mentioned as representative, hydroxyethyl, mono- and di-hydroxypropyl, mono- and di-hydroxybutyl, sorbityl, pentaerythrityl and in general other hydroxyalkyl groups having four to six carbons and one less hydroxy than carbons and which are either straight or branched chain aliphatics, and the various polyethenoxy groups represented by $R_1$. Erythrityl, arabinyl and mannityl are mentioned as other examples of hydroxyalkyl groups having 4 to 6 carbons and one less hydroxy groups than carbons.

It has been found that the compounds in which $aryl_1$ and $aryl_2$ are benzene nuclei and $R_1$, $R_2$ and $R_3$ are from the group consisting of hydroxyalkyl and polyhydroxy alkyl, having 2 to 6 carbons, have particularly good affinity for acetate silk and are the preferred class.

The dyes of the invention are characterized by excellent affinity for cellulose acetate silk, by their ability to give heavy dyeings and by the property of being easily dispersed in aqueous dye baths.

As illustrative of the manner in which dyeings are made, 0.50 part of the dye described in Example 1 was dispersed in 2000 parts of water containing 0.50 part of soap. The bath was heated to 85° C. and a skein of cellulose acetate silk was entered. The skein was dyed for 45 minutes at 85° C., rinsed, washed and dried. The skein was evenly dyed a heavy blue shade having good fastness to light. Upon applying a discharge agent, the dye discharged to white.

The mono-N-substituted 1:5-amino naphthols can be conveniently prepared by various methods. For example 1:5-amino-naphthol is reacted with the halide of the alkyl radical to be substituted in the amino group, such as pentaerythrityl bromide, $BrCH_2-C(CH_2OH)_3$ giving N-pentaerythrityl 1:5-amino-naphthol. These compounds can also be made for example, by condensation and catalytic reduction of 1:5-amino naphthol with an aldose, such as mannose or glucose. The naphthols can also be made by reacting 1-5-dihydroxy-naphthalene with the corresponding hydroxyalkyl amines and sodium bisulfite.

Since from the foregoing description of the invention it will be apparent to those skilled in the art that various other embodiments of the invention may be made without departing from the spirit and scope thereof, it is to be understood that the invention is not limited to the limitations which are specifically recited.

I claim:

1. Compounds represented by the formula

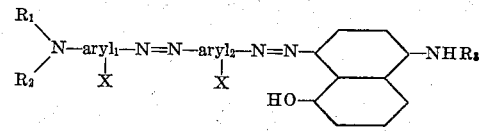

in which $aryl_1$ and $aryl_2$ are each one of a group consisting of benzene and naphthalene nuclei; each X is at least one of a group consisting of hydrogen, alkyl, alkoxy, halogen, acylamino and dialkylamino; $R_1$ and $R_2$ are at least one of a group consisting of alkyl, mono- and poly-hydroxyalkyl radicals having two to six carbons and polyethenoxy radicals represented by the formula $$-(CH_2CH_2O)_{n-1}-CH_2CH_2OH$$

in which $n-1$ has a value of 1 to 4 and which are obtainable by condensing anilines and naphthylamines with two to six moles of ethylene oxide; and $R_3$ is one of a group consisting of mono- and poly-hydroxyalkyl having two to six carbons.

2. Compounds represented by the formula

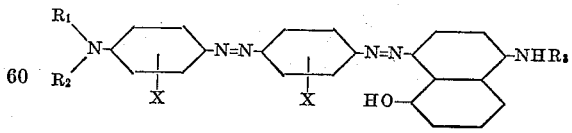

in which $aryl_1$ and $aryl_2$ are each one of a group consisting of benzene and naphthalene nuclei; each X is at least one of a group consisting of hydrogen, alkyl, alkoxy, halogen, acylamino and dialkylamino; $R_1$ and $R_2$ are at least one of a group consisting of alkyl, mono- and poly-hydroxyalkyl radicals having two to six carbons and polyethenoxy radicals represented by the formula $$-(CH_2CH_2O)_{n-1}-CH_2CH_2OH$$

in which $n-1$ has a value of 1 to 4 and which are obtainable by condensing anilines and naphthylamines with two to six moles of ethylene oxide; and $R_3$ is one of a group consisting of mono- and poly-hydroxyalkyl having two to six carbons.

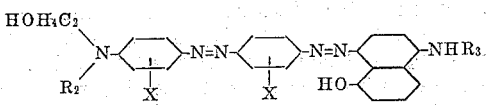

3. Compounds represented by the formula

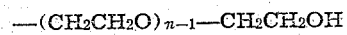

in which each X is at least one of a group consisting of hydrogen, alkyl, alkoxy, halogen, acylamino and dialkylamino; $R_2$ is one of a group consisting of alkyl, mono- and poly-hydroxyalkyl having two to six carbons and polyethenoxy radicals represented by the formula $$-(CH_2CH_2O)_{n-1}-CH_2CH_2OH$$

in which the value of $n-1$ is 1 to 4; and $R_3$ is one of a group consisting of mono- and poly-hydroxyalkyl having two to six carbons.

4. Compounds represented by the formula

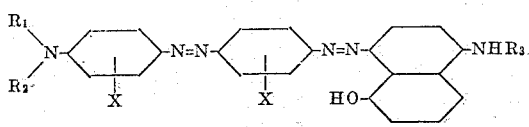

in which each X is at least one of a group consisting of hydrogen, alkyl, alkoxy, halogen, acylamino and dialkylamino; and $R_1$, $R_2$ and $R_3$ are each one of a group consisting of hydroxyalkyl and polyhydroxyalkyl having two to six carbons.

5. Compounds represented by the formula

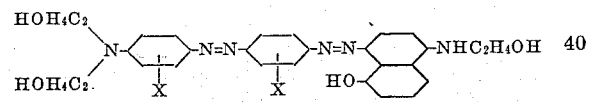

in which each X is at least one of a group consisting of hydrogen, alkyl, alkoxy, halogen, acylamino and dialkylamino.

6. The compound represented by the formula

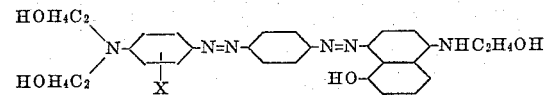

in which X is at least one of the group consisting of hydrogen, alkyl, alkoxy, halogen, acylamino and dialkylamino.

7. The compound represented by the formula

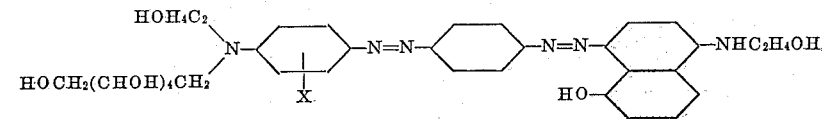

in which X is at least one of the group consisting of hydrogen, alkyl, alkoxy, halogen, acylamino and dialkylamino.

8. The compound represented by the formula

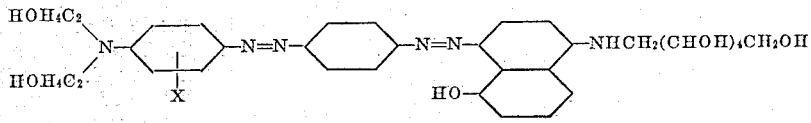

of hydrogen, alkyl, alkoxy, halogen, acylamino in which X is at least one of the group consisting of hydrogen, alkyl, alkoxy, halogen, acylamino and dialkylamino.

9. The process which comprises diazotizing a compound represented by the formula

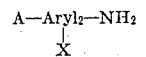

in which amino and A are in para positions to each other, $aryl_2$ is one of a group consisting of the nuclei of anilines and naphthylamines, A is one of a group consisting of acylamino, sulfonylamino and nitro and X is at least one of a group consisting of hydrogen, alkyl, alkoxy, halogen, acylamino and dialkylamino; coupling with a tertiary aryl amine of the group consisting of benzene and naphthalene tertiary amines which are represented by the formula

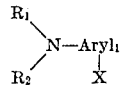

in which $R_1$ and $R_2$ are each one of a group consisting of alkyl, mono- and poly-hydroxyalkyl radicals having two to six carbons and polyethenoxy radicals represented by the formula $$-(CH_2CH_2O)_{n-1}-CH_2CH_2OH$$

in which $n-1$ has a value of 1 to 4; transforming the group A to amino; diazotizing the resulting monazo compound; and coupling with a compound represented by the formula

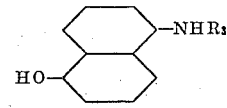

in which $R_3$ is one of a group consisting of mono- and poly-hydroxyalkyl having two to six carbons.

DONOVAN E. KVALNES.

CERTIFICATE OF CORRECTION.

Patent No. 2,244,339. June 3, 1941.

DONOVAN E. KVALNES.

It is hereby certified that error appears in the printed specification of the above numbered patent requiring correction as follows: Page 4, second column, line 10, claim 8, strike out the words "of hydrogen, alkyl, alkoxy, halogen, acylamino" and insert the same after "consisting" in same column, line 1, claim 7; and that the said Letters Patent should be read with this correction therein that the same may conform to the record of the case in the Patent Office.

Signed and sealed this 29th day of July, A. D. 1941.

(Seal)

Henry Van Arsdale,
Acting Commissioner of Patents.